US011076300B2

(12) United States Patent
Wirola et al.

(10) Patent No.: US 11,076,300 B2
(45) Date of Patent: Jul. 27, 2021

(54) DETERMINING A PLURALITY OF POTENTIAL INSTALLATION POSITIONS

(71) Applicant: HERE GLOBAL B.V., Eindhoven (NL)

(72) Inventors: Lauri Aarne Johannes Wirola, Tampere (FI); Henri Jaakko Julius Nurminen, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/030,446

(22) Filed: Jul. 9, 2018

(65) Prior Publication Data

US 2020/0015096 A1   Jan. 9, 2020

(51) Int. Cl.
*H04W 40/00* (2009.01)
*H04W 16/20* (2009.01)
(Continued)

(52) U.S. Cl.
CPC .......... *H04W 16/20* (2013.01); *H04L 41/145* (2013.01); *H04W 24/02* (2013.01); *H04W 24/10* (2013.01)

(58) Field of Classification Search
CPC ..... H04W 24/00; H04W 64/00; H04W 16/20; H04W 24/10; H04W 40/244; H04W 68/005; H04W 84/18; H04W 88/08
USPC ... 455/446, 430, 456.1, 179.1, 412.1, 552.1, 455/553.1, 513, 567, 452.1, 423, 427, 455/12.1, 429, 472, 456.5
See application file for complete search history.

(56) References Cited

U.S. PATENT DOCUMENTS 6,272,317 B1 * 8/2001 Houston ............ H04B 7/18578
                                                         342/354
8,204,512 B2   6/2012 Dietrich et al.
(Continued)

FOREIGN PATENT DOCUMENTS

EP         3 252 492 A1    12/2017
WO   WO 2015/197107 A1   12/2015
(Continued)

OTHER PUBLICATIONS

Hu, B., *Analysis and Modelling of WiFi Access Point Propagation Data*, (Research Paper) The University of York, UK (dated Aug. 19, 2011) 57 pages.
(Continued)

*Primary Examiner* — Joseph Arevalo
(74) *Attorney, Agent, or Firm* — Alston & Bird LLP

(57) ABSTRACT

It is inter-alia disclosed method performed by an apparatus, said method comprising:
  determining a plurality of potential installation positions for installing a plurality of monitoring and/or controlling apparatuses in a predetermined environment at least partially based on a radio coverage map for said predetermined environment, wherein each monitoring and/or controlling apparatus of said plurality of monitoring and/or controlling apparatuses is configured for monitoring and/or controlling one or more radio positioning support devices of a plurality of radio positioning support devices, and wherein said radio coverage map contains or represents a respective radio coverage model for each radio position support device of said plurality of radio positioning support devices.

20 Claims, 5 Drawing Sheets

(51) Int. Cl.
*H04L 12/24* (2006.01)
*H04W 24/02* (2009.01)
*H04W 24/10* (2009.01)

(56) References Cited

U.S. PATENT DOCUMENTS

| | | | | |
|---|---|---|---|---|
| 9,433,032 | B1* | 8/2016 | Ghadge | H04W 84/08 |
| 9,877,219 | B2 | 1/2018 | Mahasenan et al. | |
| 10,012,719 | B2* | 7/2018 | Meredith | G01S 5/0231 |
| 10,425,174 | B2* | 9/2019 | Saito | H04B 17/23 |
| 2003/0080961 | A1* | 5/2003 | Blaho | G06T 15/04 |
| | | | | 345/426 |
| 2003/0080966 | A1* | 5/2003 | Blaho | G06T 15/50 |
| | | | | 345/582 |
| 2004/0256474 | A1* | 12/2004 | Park | G05D 1/0246 |
| | | | | 236/51 |
| 2006/0064202 | A1* | 3/2006 | Gutmann | G05D 1/0221 |
| | | | | 700/245 |
| 2007/0041360 | A1* | 2/2007 | Gallagher | H04W 88/12 |
| | | | | 370/352 |
| 2007/0086420 | A1* | 4/2007 | Schotten | H04W 88/06 |
| | | | | 370/348 |
| 2008/0086236 | A1* | 4/2008 | Saito | G01S 5/0252 |
| | | | | 700/245 |
| 2008/0180227 | A1 | 7/2008 | Le et al. | |
| 2011/0009132 | A1* | 1/2011 | Skarby | G01S 5/0263 |
| | | | | 455/456.5 |
| 2012/0057547 | A1* | 3/2012 | Lohr | H04L 5/0007 |
| | | | | 370/329 |
| 2013/0336138 | A1 | 12/2013 | Vankatraman et al. | |
| 2014/0256348 | A1* | 9/2014 | Wirola | H04W 64/00 |
| | | | | 455/456.1 |
| 2016/0161592 | A1 | 6/2016 | Wirola et al. | |
| 2016/0259061 | A1* | 9/2016 | Carter | G01S 19/14 |
| 2016/0323754 | A1 | 11/2016 | Friday et al. | |
| 2017/0079002 | A1 | 3/2017 | Fujita et al. | |
| 2017/0188188 | A1* | 6/2017 | Kang | H04L 61/6022 |
| 2017/0223511 | A1* | 8/2017 | Jampani | H04W 4/021 |
| 2017/0251381 | A1* | 8/2017 | Buer | H04B 7/18508 |
| 2017/0295556 | A1 | 10/2017 | Krishnamoorthy et al. | |
| 2018/0131557 | A1* | 5/2018 | Chou | H04L 41/08 |
| 2018/0220322 | A1* | 8/2018 | Atre | H04W 28/02 |
| 2018/0294876 | A1* | 10/2018 | Abidi | H04B 10/27 |
| 2018/0302239 | A1* | 10/2018 | Ying | H04L 12/4633 |
| 2018/0316608 | A1* | 11/2018 | Dowlatkhah | H04W 76/10 |
| 2018/0316779 | A1* | 11/2018 | Dowlatkhah | H04L 67/327 |
| 2018/0324138 | A1* | 11/2018 | Das | H04L 61/2015 |
| 2018/0324577 | A1* | 11/2018 | Faccin | H04W 8/06 |
| 2018/0332442 | A1* | 11/2018 | Shaw | H04W 4/70 |

FOREIGN PATENT DOCUMENTS

| | | |
|---|---|---|
| WO | WO 2018/032107 A1 | 2/2018 |
| WO | WO 2019/034237 A1 | 2/2019 |

OTHER PUBLICATIONS

Where do I place my hub if I have multiple access points?—LeakSmart [online][retrieved Jul. 26, 2018]. Retrieved from the Internet: <URL: https://leaksmart.com/hrf_faq/place-hub-multiple-access-points/>. (dated 2018) 2 pages.

Extended European Search Report for Application No. EP 19 18 3009 dated Nov. 28, 2019, 8 pages.

Office Action for European Application No. 19183009.0 dated Sep. 21, 2020, 6 pages.

* cited by examiner

DETERMINING A PLURALITY OF POTENTIAL INSTALLATION POSITIONS

FIELD OF THE DISCLOSURE

The invention relates to the field of positioning and more specifically to determining a plurality of potential installation positions for installing a plurality of monitoring and/or controlling apparatuses in a predetermined environment.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor and outdoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A Bluetooth based positioning solution such as a self-contained positioning system, for instance, may be divided in at least three stages, an installation stage, a training stage and a positioning stage.

In the installation stage, Bluetooth beacons are installed in the environment for which a positioning solution is to be provided.

In the subsequent training stage, positioning data are collected. The data may be collected in the form of radio fingerprint observation reports that are based on measurements by mobile devices. A radio fingerprint observation report may indicate an observation position and measurements taken from the radio interface at the observation position. The observation position may be for example GNSS based, sensor-based, or manually inputted. Measurements taken from the radio interface may comprise, by way of example, measured received signal strengths and identifiers of Bluetooth beacons transmitting the radio signals. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crow-sourcing is a background process that does not directly benefit the device user, it is desirable that the crowd-sourcing process only consumes limited resources of the device.

Alternatively or in addition, mobile devices may be used for collecting radio fingerprint observation reports in a systematic manner. Collected fingerprint data may be uploaded to a database in a positioning server or in a positioning cloud, where algorithms may be run to generate radio coverage models of Bluetooth beacons and/or radio coverage maps for positioning purposes.

In the positioning stage, a mobile device may estimate its current position based on own measurements taken from the radio interface and on the data or a subset of data that is available from the training stage. Radio coverage model data or radio coverage map data that has been generated in the training stage may be transferred to mobile devices by a positioning server via the Internet as assistance data for use in position determinations. Alternatively, radio coverage model data and/or radio coverage map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

It is inter-alia an object of the present invention to improve the above described implementation.

According to an exemplary aspect of the invention, a method is disclosed, wherein the method comprises:

determining a plurality of potential installation positions for installing a plurality of monitoring and/or controlling apparatuses in a predetermined environment at least partially based on a radio coverage map for the predetermined environment, wherein each monitoring and/or controlling apparatus of the plurality of monitoring and/or controlling apparatuses is configured for monitoring and/or controlling one or more radio positioning support devices of a plurality of radio positioning support devices, and wherein the radio coverage map contains or represents a respective radio coverage model for each radio position support device of the plurality of radio positioning support devices.

The disclosed method may be performed by an apparatus such as a positioning server. Alternatively, the disclosed method may be performed by a positioning system (e.g. a positioning system for the predetermined environment) comprising the plurality of radio positioning support devices and the positioning server. The positioning system may be a self-contained positioning system.

The positioning server may at least partially serve for generating and/or updating the radio coverage map. In certain exemplary embodiments of the invention, the positioning server may be part of a server cloud (e.g. which comprises a plurality of servers) or may be represented by a server cloud (e.g. which comprises a plurality of servers).

In certain exemplary embodiments of the invention, the predetermined environment may be a predetermined indoor environment. Accordingly, the positioning server may be an indoor positioning server of an indoor positioning system for this predetermined indoor environment. For example, the indoor environment is inside a building or a complex of buildings like a shopping center, a parking garage, an airport, a company site, etc.

The plurality of radio positioning support devices may be installed in the predetermined environment and/or may be part of the positioning system (e.g. the positioning system for the predetermined environment). The installation positions of the plurality of radio positioning support devices in the predetermined environment may be known, for example represented by the radio coverage map or radio coverage map information. For example, the installation positions of the plurality of radio positioning support devices may be obtained (e.g. by user input or measurements) when installing the plurality of radio positioning support devices in the predetermined environment.

One or more (e.g. all) radio positioning support devices of the plurality of radio positioning support devices may transmit (e.g. broadcast) or trigger to transmit or may be configured to transmit or to trigger to transmit a respective radio signal (e.g. a radio positioning support signal and/or a radio state signal). For example, one or more (e.g. all) radio positioning support devices of the plurality of radio positioning support devices may transmit (e.g. broadcast) or trigger to transmit or may be configured to transmit or to trigger to transmit (a) respective radio signal(s) like (a) respective radio positioning support signal(s) and/or a (a) respective radio state signal(s) automatically and/or repeatedly, for example on a periodic basis. The respective radio positioning support signal(s) may contain or represent positioning support information. The positioning support information are for example configured to enable one or more mobile devices receiving the respective radio positioning support signal(s) to estimate their position at least partially based on these positioning support information. An example of such positioning support information is an identifier of the radio positioning support device of the plurality of radio positioning support devices by which the respective radio positioning support signal is transmitted (e.g. broadcasted) or triggered to be transmitted. The respective radio state signal(s) may contain or represent state information which are characteristic for the current state of the radio positioning support device of the plurality of radio positioning support devices by which the respective radio positioning support signal is transmitted (e.g. broadcasted) or triggered to be transmitted. For example, such state information may indicate a radio transmission power and/or a battery condition.

In this specification, information may be understood to mean information in encoded form, for example information in the form of data or a signal (e.g. a radio signal and/or a network signal).

The radio coverage map is for example a positioning map of a positioning system (e.g. a positioning system for the predetermined environment). For example, the disclosed method is performed in the training stage of the positioning system. The radio coverage map may be a radio coverage map for the predetermined environment (e.g. an indoor environment) that is generated based on radio fingerprint observation reports as disclosed above.

The radio coverage map may be configured to enable one or more mobile devices to estimate their position at least partially based on this radio coverage map map when the mobile device is located in the predetermined environment. For example, the radio coverage map is represented by radio coverage map information which may be transmitted or triggered to be transmitted from the positioning server to the mobile device(s) and/or which may be hold available by the mobile device(s) (e.g. stored in memory means of the mobile device(s)).

The radio coverage map for the predetermined environment contains or represents a respective radio coverage model for each radio position support device of the plurality of radio positioning support devices. Therein, a respective radio coverage model for a respective radio position support device of the plurality of radio positioning support devices may be understood to represent at least the expected radio coverage of the respective radio position support device. For example, the radio coverage model of such a radio positioning support device may describe the area (e.g. the area of the predetermined environment) within which radio signals (e.g. radio positioning support signals and/or radio state signals) transmitted or triggered to be transmitted by this radio positioning support device are expected to be observable. The real radio coverage of such a radio positioning support device may however deviate from the expected radio coverage as described by such a radio coverage model.

A radio signal may be understood to be observable at a certain position if the radio signal is receivable with a minimum quality (e.g. a minimum signal-to-noise ratio and/or a minimum signal power, e.g. at least −90 dbm or −95 dbm) at this position.

A radio coverage model of a radio positioning support device may be a hard-boundary model or a soft-boundary model (e.g. a hard-boundary model or a soft-boundary model describing expected radio coverage). For example, the radio coverage map for the predetermined environment may contain or represent a respective hard-boundary model or a soft-boundary radio coverage model for each radio position support device of the plurality of radio positioning support devices.

An example for a soft-boundary radio coverage model for a radio positioning support device may be a parametric radio model. Parameters of such a parametric radio model may be considered to be parameters which enable determination of one or more characteristics of one or more radio signals (e.g. radio positioning support signals and/or radio state signals) transmitted or triggered to be transmitted by the radio positioning support device that are expected to be observable at different positions. For example, parameters of such a parametric radio model may represent radio signal parameters of the parametric radio model. Using radio signal parameters of the parametric radio model may have the effect that the required amount of information for defining the one or more characteristics of one or more radio signals may be particularly small. An example of a parametric radio model is a path loss model for radio signals (e.g. radio positioning support signals and/or radio state signals) transmitted or triggered to be transmitted by the respective radio node.

An example for a hard-boundary radio coverage model for a radio positioning support device may be a geometric model. Information of such a geometric radio model may be considered to be information which (e.g. geometrically) describe (e.g. define) an expected radio coverage of the radio positioning support device. Examples of such a geometric radio model are: a polygon; a rectangle and/or a square; a cuboid and/or a cube; an ellipse and/or a circle; and an ellipsoid and/or a sphere.

By receiving one or more of radio signals (e.g. radio positioning support signals) of one or more radio positioning support device of the plurality of radio positioning support devices and/or by evaluating (e.g. measuring) such one or more radio signals, a mobile device may for example determine (e.g. estimate) its position when it is located in the predetermined environment by additionally using radio coverage map information representing the radio coverage map.

The plurality of monitoring and/or controlling apparatuses may serve for monitoring and/or controlling the plurality of radio positioning support devices. To this end, the plurality of monitoring and/or controlling apparatuses may be installed such that each radio positioning support devices of the plurality of radio positioning support may be monitored and/or controlled by at least one monitoring and/or controlling apparatus of the plurality of monitoring and/or controlling apparatuses. The position at which a monitoring and/or controlling apparatus of the plurality of monitoring and/or controlling apparatuses is installed may be referred to as installation position of this monitoring and/or controlling apparatus.

Monitoring one or more radio positioning support devices of the plurality of radio positioning support devices by a respective monitoring and/or controlling apparatus may for example be understood to mean that the respective monitoring and/or controlling apparatus scans for and/or evaluates (e.g. measures) radio signals (e.g. radio positioning support signals and/or radio state signals transmitted or triggered to be transmitted by the one or more radio positioning support devices). For example, the respective monitoring and/or controlling apparatus may be configured to scan for and/or evaluate (e.g. measures) radio signals for monitoring the one or more radio positioning support devices.

For monitoring one or more radio positioning support devices of the plurality of radio positioning support devices, the respective monitoring and/or controlling apparatus is to be installed within the radio coverage of the one or more radio positioning support devices such that radio signals (e.g. radio positioning support signals and/or radio state signals) transmitted or triggered to be transmitted by the one or more radio positioning support devices are observable by the respective monitoring and/or controlling apparatus. Monitoring one or more radio positioning support devices of the plurality of radio positioning support devices may thus at least involve a wireless one-way communication from the one or more radio positioning support devices to the respective monitoring and/or controlling apparatus. For example, the one or more radio positioning support devices may transmit (e.g. broadcast) or trigger to transmit radio state signals to communicate state information to the respective monitoring and/or controlling apparatus.

Controlling one or more radio positioning support devices by a respective monitoring and/or controlling apparatus may be understood to mean that the respective monitoring and/or controlling apparatus controls one or more radio signal parameters (e.g. the transmission power) of the one or more radio positioning support devices, for example by transmitting or triggering transmitting control information (e.g. in the form of a radio control signal) to the one or more radio positioning support devices. For example, the respective monitoring and/or controlling apparatus may be configured to control the one or more radio positioning support devices, for example by transmitting or triggering transmitting control information (e.g. in the form of a radio control signal) for controlling one or more radio signal parameters (e.g. the transmission power) of the one or more radio positioning support devices to the one or more radio positioning support devices.

For controlling the one or more radio positioning support devices of the plurality of radio positioning support devices, the respective monitoring and/or controlling apparatus is to be installed such that radio signals transmitted or triggered to be transmitted by the respective monitoring and/or controlling apparatus are observable by the one or more radio positioning support devices. Controlling one or more radio positioning support devices of the plurality of radio positioning support devices may thus at least involve a wireless one-way communication from the respective monitoring and/or controlling apparatus to the one or more radio positioning support devices. For example, the respective monitoring and/or controlling apparatus may transmit or trigger to transmit radio control signals to the one or more radio positioning support signals to communicate control information to them.

It is to be understood that the respective monitoring and/or controlling apparatus may as well monitor and control the one or more radio positioning support devices of the plurality of radio positioning support devices which thus involves a two-way communication between the respective monitoring and/or controlling apparatus and the one or more radio positioning support devices.

For example, a potential installation position is a position in the predetermined environment and/or relative to the predetermined environment. A potential installation position may be understood to describe a position in the predetermined environment at which a monitoring and/or controlling apparatus of the plurality of monitoring and/or controlling apparatuses may be installed. Accordingly, the plurality of potential installation positions for installing the plurality of monitoring and/or controlling apparatuses may describe, for each monitoring and/or controlling apparatus of the plurality of monitoring and/or controlling apparatuses, a respective position in the predetermined environment at which the respective monitoring and/or controlling apparatus may be installed.

That the plurality of potential installation positions for installing the plurality of monitoring and/or controlling apparatuses in the predetermined environment are determined at least partially based on a radio coverage map for the predetermined environment may be understood to mean that the determining is at least partially a function of the radio coverage map. For example, the determining of the plurality of potential installation positions for installing the plurality of monitoring and/or controlling apparatuses in the predetermined environment may be performed according to predetermined rules like a predetermined algorithm or predetermined instructions (e.g. in the form of computer program code) receiving and/or considering the radio coverage map or the radio coverage map information as an input parameter.

Considering the radio coverage map and in particular overlapping expected radio coverages of the plurality of radio positioning support devices represented by the radio coverage map when determining the plurality of potential installation positions for installing the plurality of monitoring and/or controlling apparatuses in the predetermined environment may allow to optimize the plurality of potential installation positions for installing the plurality of monitoring and/or controlling apparatuses such that a minimum number of monitoring and/or controlling apparatuses is expected to be sufficient for monitoring and/or controlling the plurality of radio positioning support devices. It is to be understood that, since the real radio coverage of the plurality of radio positioning support devices may deviate from the radio coverage represented by the radio coverage map, the minimum number of monitoring and/or controlling apparatuses expected to be sufficient for monitoring and/or controlling the plurality of radio positioning support devices may be not sufficient in reality. In this case, it may for example be necessary to install further monitoring and/or controlling apparatuses as disclosed in detail below. Nevertheless, the invention may allow to reduce the number of monitoring and/or controlling apparatuses and to perform a very efficient installation of the plurality of monitoring and/or controlling apparatuses in the predetermined environment.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be modules or components for a device, for example chips. Alternatively, the disclosed apparatus(es) may be devices. In particular, the disclosed apparatus(es) may be a positioning server.

The positioning server may at least partially serve for generating and/or updating the positioning map. The positioning server may be part of a positioning system. In certain exemplary embodiments of the invention, the positioning server may be part of a server cloud which comprises a plurality of servers or may be represented by a server cloud which comprises a plurality of servers.

It is to be understood that the disclosed apparatus(es) may comprise only the disclosed components (e.g. means) or may further comprise one or more additional components (e.g. means). Examples of such additional components are a communication interface, a network interface, a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a system is disclosed which comprises the plurality of radio positioning support devices and the positioning server.

The system may be a positioning system for performing any one embodiment of the disclosed method. For example, the plurality of radio positioning support devices and the positioning server may be configured to cooperate to perform any one embodiment of the disclosed method (e.g. some steps of any one embodiment of the disclosed method may be performed by one or more (e.g. all) radio positioning support devices of the plurality of radio positioning support devices and the other steps may be performed by the positioning server).

For example, one or more (e.g. all) radio positioning support devices of the plurality of radio positioning support devices and the positioning server of the disclosed system may comprise means for performing the steps of any one embodiment of the disclosed method by cooperating (e.g. some steps of any one embodiment of the disclosed method may be performed by means of the one or more (e.g. all) radio positioning support devices of the plurality of radio positioning support devices and the other steps may be performed by means of the positioning server). Therein, these means can be implemented in hardware and/or software like the means of the above disclosed apparatus(es).

Alternatively or additionally, one or more (e.g. all) radio positioning support devices of the plurality of radio positioning support devices and the positioning server of the disclosed system may comprise at least one processor and at least one memory containing computer program code. Therein, the computer program code contained (e.g. stored) in the memories of the one or more (e.g. all) radio positioning support devices of the plurality of radio positioning support devices and the positioning server may be configured to cause the one or more (e.g. all) radio positioning support devices of the plurality of radio positioning support devices and the positioning server to cooperate to at least to perform any one embodiment of the disclosed method.

According to a further exemplary aspect of the invention, a non-transitory computer readable storage medium is disclosed, in which computer program code is stored. The computer program code causes an apparatus or system to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus or system to perform any one embodiment of the disclosed method (e.g. the steps of any one embodiment of the disclosed method).

The disclosed method, apparatus(es), system, non-transitory computer readable storage medium and computer program code may be for determining a plurality of potential installation positions for installing a plurality of monitoring and/or controlling apparatuses in a predetermined environment.

In the following, further features and embodiments of these exemplary aspects of the invention will be described.

According to an exemplary embodiment of the invention, the method further comprises:

receiving a plurality of radio fingerprint observation reports;

generating the radio coverage map for the predetermined environment at least partially based on the plurality of radio fingerprint observation reports.

The plurality of radio fingerprint observation reports may be collected by one or more mobile device(s) (e.g. during the training stage of the positioning system). Accordingly, the radio fingerprint observation reports may be received (e.g. by the positioning server) from the mobile device(s). For example, the plurality of radio fingerprint observation reports may be (e.g. automatically and/or repeatedly, e.g. on a periodic basis) reported (e.g. to the positioning server) by the mobile device(s) (e.g. during the training stage of the positioning system).

The mobile device(s) may be configured to (e.g. automatically and/or repeatedly) scan for radio signals (e.g. radio positioning support signals transmitted or triggered to be transmitted by the plurality of radio positioning support devices) and to generate a respective radio fingerprint observation report at least partially based on the respective scanning results.

Accordingly, each radio fingerprint observation report of the plurality of radio fingerprint observation reports at least partially represents and/or is generated based on radio signal scanning results of a respective mobile device. Radio signal scanning results may be understood to represent information which are characteristic for the observable radio signal(s)

when scanning for radio signals. Such characteristic information may be determined by measuring radio signal parameters (e.g. received signal strength(s)) of the observed radio signal(s) and/or by extracting information (e.g. identifier(s) or transmission power(s)) from the observed radio signal(s).

For example, each radio fingerprint observation report of the plurality of radio fingerprint observation reports contains and/or represents an indication of a respective observation position (e.g. the respective observation position at which the mobile device scanned for radio signals) and one or more radio positioning support devices of the plurality of radio positioning support devices from which radio signals are observable at the respective observation position.

The observation position may for example be determined based on user input and/or based on the radio coverage map and/or based on a positioning sensor (e.g. a GNSS sensor and/or one or more inertial sensors). An indication of the observation position may be understood to describe (e.g. define) the observation position relative to the predetermined environment, for example by means of horizontal distance(s) and/or vertical distance(s) to one or more fixed objects and/or features (e.g. a wall, a floor, a ceiling, a corner, a door opening, a window opening, etc.) of the predetermined environment. Alternatively and/or additionally, an indication of the observation position may be understood to describe the observation position absolute, for example by means of geographic coordinates (e.g. longitude and altitude) or GNSS coordinates.

An example of an indication for a radio positioning support device may be an identifier of the radio positioning support device like a name, an address (e.g. a MAC address or an IP address), an universally unique identifier (UUID), a service set identifier (SSID), a basic service set identifier (BSSID), or a combination thereof. Such identifiers may be determined by the respective mobile device by extracting the identifiers from the observable radio signals when scanning for radio signals. For example, the mobile device(s) may be configured to extract a respective identifier from each of the observable radio signals when scanning for radio signals. As disclosed above, the radio positioning support signals transmitted or triggered to be transmitted by one or more (e.g. all) radio positioning support devices of the plurality of radio positioning support devices may for example contain or represent an identifier of the radio positioning support device of the plurality of radio positioning support devices by which the respective radio positioning support signal is transmitted or triggered to be transmitted as positioning support information.

Optionally, the mobile device(s) (e.g. a radio interface of the mobile device) may be configured to determine (e.g. measure) radio signal parameters like a received signal strength of the radio signals observable at the observation position when scanning for radio signals. One or more (e.g. all) radio fingerprint observation reports of the plurality of radio fingerprint observation reports may then indicate these radio signal parameters (e.g. measured received signal strengths for the radio signals observable at the observation position).

Generating the radio coverage map for the predetermined environment at least partially based on the plurality of radio fingerprint observation reports may involve determining, for one or more (e.g. all) radio positioning support devices of the plurality of radio positioning support devices, a respective radio coverage model at least partially based on the plurality of radio fingerprint observation reports. Additionally, this generating may be based on further information (e.g. a previously generated radio coverage map for the predetermined environment). For example, a previously generated radio coverage map for the predetermined environment may be updated by determining, for one or more (e.g. all) radio positioning support devices of the plurality of radio positioning support devices a respective radio coverage model at least partially based on the plurality of radio fingerprint observation reports.

As disclosed above, a radio coverage model of a radio positioning support device may be soft-boundary model like a parametric radio model or a hard-boundary radio coverage model like a geometric model.

Radio signal parameters of a parametric radio model of a radio coverage of a radio positioning support device may be at least partially determined (e.g. derived or selected or calculated) at least partially based on the plurality of radio fingerprint observation reports. For example, the radio signal parameters of a parametric radio model of a radio positioning support device may at least partially correspond to and/or determined based on one or more indications and/or radio signal parameters associated with this radio positioning support device as represented by the plurality of radio fingerprint observation reports.

If the installation positions of the plurality of radio positioning support devices and, thus, also the distances between the radio positioning support devices and the observation position indicated by a radio fingerprint observation report are known, such indications and/or radio signal parameters associated with a radio positioning support device may for example be used to determine (e.g. calculate) further radio signal parameters for a parametric radio model like a path loss exponent.

A parameter of a geometric model of a radio coverage of a radio positioning support device may be at least partially determined (e.g. selected or calculated) at least partially based on the plurality of radio fingerprint observation reports. Examples of such parameters are a diameter, a radius and/or an edge length of the geometric model. For example, a parameter of a geometric model of a radio positioning support device may be selected from a list of parameters according to a predetermined mapping with the radio signal parameters associated with this radio positioning support device as represented by the plurality of radio fingerprint observation reports.

According to an exemplary embodiment of the invention, the plurality of potential installation positions for installing monitoring and/or controlling apparatuses in the predetermined environment are determined such that a minimum number or less than a predetermined threshold number of monitoring and/or controlling apparatuses are expected to be sufficient for monitoring and/or controlling the plurality of radio positioning support devices.

As disclosed above, it is to be understood that, since the real radio coverage of the plurality of radio positioning support devices may deviate from the radio coverage represented by the radio coverage map, the number of monitoring and/or controlling apparatuses expected to be sufficient for monitoring and/or controlling the plurality of radio positioning support devices may be not sufficient in reality. In this case, it may for example be necessary to install further monitoring and/or controlling apparatuses as disclosed in detail below.

According to an exemplary embodiment of the invention, wherein the plurality of potential installation positions may be selected from a plurality of predetermined positions in the predetermined environment. This may be understood to mean that only the plurality of predetermined positions are considered as potential installation positions when determining the plurality of potential installation positions for installing monitoring and/or controlling apparatuses in the predetermined environment which may have the effect that the computing resources needed for determining the plurality of potential installation positions is limited.

For example, the plurality of predetermined positions may represent positions in the predetermined environment that are (e.g. easy) accessible for installing monitoring and/or controlling apparatuses; and/or the plurality of predetermined positions may represent mesh points of a predetermined mesh (e.g. a mesh with a mesh size of 5 m or 2 m or 1 m) when the predetermined mesh overlays the predetermined environment. By predetermining the mesh size, the computing resources needed for determining the plurality of potential installation positions and the desired optimization of the plurality of potential installation positions may be balanced.

According to an exemplary embodiment of the invention, wherein the plurality of potential installation positions for installing the plurality of monitoring and/or controlling apparatuses in the predetermined environment are determined iteratively.

For example, in each iteration, a respective potential installation position for a respective monitoring and/or controlling apparatus for monitoring and/or controlling one or more (e.g. a maximum number of) respective radio positioning support devices of the plurality of radio positioning support devices that are not expected to be monitored and/or controlled by any other monitoring and/or controlling apparatus installed at any installation position determined in any previous iteration is determined. Accordingly, in a first iteration, a first potential installation position of the plurality of potential installation positions for installing the plurality of monitoring and/or controlling apparatuses in the predetermined environment may be determined such that it represents a position at which radio signals of a maximum number of radio positioning support devices is expected to be observable by a monitoring and/or controlling apparatus of the plurality of monitoring and/or controlling apparatuses. The iteratively determining may be terminated, if each radio positioning support device of the plurality of radio positioning support devices is expected to be monitored and/or controlled by at least one monitoring and/or controlling apparatus of the plurality of monitoring and/or controlling apparatus when the plurality of monitoring and/or controlling apparatus are installed at the plurality of installations positions which have been iteratively determined. Therein, a respective radio positioning support device of the plurality of radio positioning support devices may be expected to be monitored and/or controlled by at least one monitoring and/or controlling apparatus of the plurality of monitoring and/or controlling apparatuses if radio signals of the respective radio positioning support device are expected to be observable at at least one potential installation position of the plurality of installation positions (e.g. at least one potential installation position of the plurality of installation positions is within an expected radio coverage of the respective radio positioning support device as represented by the radio coverage map).

By iteratively determining the plurality of potential installation positions for installing the plurality of monitoring and/or controlling apparatuses in the predetermined environment, the number of potential installation positions of the plurality of potential installation positions is minimized which means that a minimum number of monitoring and/or controlling apparatuses is expected to be sufficient for monitoring and/or controlling the plurality of radio positioning support devices.

According to an exemplary embodiment of the invention, the method further comprises:

providing installation information for installing the plurality of monitoring and/or controlling apparatuses in the predetermined environment representing the plurality of potential installation positions.

The installation information may comprise respective position information for each potential installation position of the plurality of potential installation positions. For example, respective position information for a respective potential installation position of the plurality of potential installation positions may be understood to describe (e.g. define) the respective potential installation position relative to the predetermined environment, for example by means of horizontal distance(s) and/or vertical distance(s) to one or more fixed objects and/or features (e.g. a wall, a floor, a ceiling, a corner, a door opening, a window opening, etc.) of the predetermined environment. Alternatively and/or additionally, respective position information for a respective potential installation position of the plurality of potential installation positions may be understood to describe (e.g. define) the respective potential installation position absolute, for example by means of geographic coordinates (e.g. longitude and altitude) or GNSS coordinates.

For example, the installation information may be provided by displaying the installation information on a user interface (e.g. a user interface of an apparatus like a mobile device and/or the positioning server). For example, position information as described above may be displayed on the user interface. Alternatively or additionally, a graphical model of the predetermined environment with an indication of the plurality of installation positions may be displayed on the user interface, for example the plurality of installation positions may be indicated by graphical features (e.g. symbols) at corresponding positions in the graphical model of the predetermined environment. Examples of a two-dimensional graphical model of the predetermined environment are a map, a floor plan, etc.

According to an exemplary embodiment of the invention, the method further comprises:

after installation of the plurality of monitoring and/or controlling apparatuses in the predetermined environment, receiving a plurality of monitoring reports from the plurality of monitoring and/or controlling apparatuses.

The installation positions of the plurality of monitoring and/or controlling apparatuses in the predetermined environment may be known, for example represented by the coverage map or coverage map information. For example, the installation positions of the plurality of monitoring and/or controlling apparatuses may be determined (e.g. based on user input and/or the radio coverage map and/or a positioning sensor) when installing the plurality of monitoring and/or controlling apparatuses in the predetermined environment.

The plurality of monitoring reports may be collected by the plurality of monitoring and/or controlling apparatuses. Accordingly, the plurality of monitoring reports may be received (e.g. by the positioning server) from the plurality of monitoring and/or controlling apparatuses. For example, the plurality of monitoring reports may be (e.g. automatically and/or repeatedly, e.g. on a periodic basis) reported (e.g. to the positioning server) by the plurality of monitoring and/or controlling apparatuses.

One or more (e.g. all) of the plurality of monitoring and/or controlling apparatuses plurality of monitoring and/or controlling apparatuses may be configured to (e.g. automatically and/or repeatedly, e.g. on a periodic basis) report collected monitoring reports (e.g. to the positioning server). For example, one or more (e.g. all) of the plurality of monitoring and/or controlling apparatuses may be configured to (e.g. automatically and/or repeatedly, e.g. on a periodic basis) scan for and/or evaluate (e.g. measure) radio signals (e.g. radio positioning support signals and/or radio state signals transmitted or triggered to be transmitted by the plurality of radio positioning support devices) and to generate a respective monitoring report at least partially based on the respective scanning results.

Accordingly, each monitoring report of the plurality of monitoring reports at least partially represents and/or is generated based on radio signal scanning results of a respective monitoring and/or controlling apparatus of the plurality of monitoring and/or controlling apparatuses. Radio signal scanning results may be understood to represent information which is characteristic for the radio signal(s) observed when scanning for radio signals. As disclosed above, such characteristic information may be determined by measuring radio signal parameters (e.g. received signal strength(s)) of the observed radio signal(s) and/or by extracting information (e.g. identifier(s) or state information) from the observed radio signal(s).

For example, each monitoring report of the plurality of monitoring reports contains and/or represents an indication of one or more radio positioning support devices of the plurality of radio positioning support devices from which radio signals are observable by the respective monitoring and/or controlling apparatus (e.g. at the respective installation position of the respective monitoring and/or controlling apparatus).

As disclosed above, an example of an indication for a radio positioning support device may be an identifier of the radio positioning support device like a name, an address (e.g. a MAC address or an IP address), an universally unique identifier (UUID), a service set identifier (SSID), a basic service set identifier (BSSID), a beacon identifier like an Eddystone-UID (e.g. comprising a unique, static ID with a 10-byte Namespace component and a 6-byte Instance component) or a combination thereof. Such identifiers may be determined by the respective monitoring and/or controlling apparatus by extracting the identifiers from the observable radio signals when scanning for radio signals.

Optionally, one or more (e.g. all) of the plurality of monitoring and/or controlling apparatuses may be configured to determine (e.g. measure) radio signal parameters like a received signal strength of the radio signals observed and/or extract state information (e.g. indicating (a) transmission power(s) and/or (a) battery condition(s)) from the radio signals observed when scanning for radio signals. One or more (e.g. all) monitoring reports of the plurality of monitoring reports may then indicate these radio signal parameters (e.g. measured received signal strengths for the observable radio signals) and/or represent or contain the extracted state information (e.g. indicating (a) transmission power(s) and/or (a) battery condition(s)).

The radio coverage map for the predetermined environment may be generated at least partially based on the plurality of monitoring reports, for example by determining, for one or more (e.g. all) radio positioning support devices of the plurality of radio positioning support devices, a respective radio coverage model at least partially based on the plurality of monitoring reports. Additionally, this generating may be based on further information (e.g. a previously generated radio coverage map for the predetermined environment). For example, a previously generated radio coverage map for the predetermined environment may be updated by determining, for one or more (e.g. all) radio positioning support devices of the plurality of radio positioning support devices a respective radio coverage model at least partially based on the plurality of monitoring reports.

The monitoring reports may thus be used for generating the radio coverage map like (e.g. instead of or in addition to) the plurality of radio fingerprint observation reports disclosed above.

Alternatively or additionally, the monitoring reports may be used for monitoring the plurality of radio positioning support devices. For example, for each monitoring report of the plurality of monitoring reports, it may be determined whether the respective monitoring report contains or represents a respective indication for each radio positioning support device of the plurality of radio positioning support devices that is expected to be observable by the respective monitoring and/or controlling apparatus of the plurality of monitoring and/or controlling apparatuses which has generated the respective monitoring report. If it is determined that the respective monitoring report does not contain or represent a respective indication for at least one radio positioning support device of the plurality of radio positioning support devices that is expected to be observable and/or was previously observable by the respective monitoring and/or controlling apparatus of the plurality of monitoring and/or controlling apparatuses which has generated the respective monitoring report, this may be considered as an indication that the radio coverage of the at least one radio positioning support device of the plurality of radio positioning support devices has changed (e.g. due to a change in the radio environment and/or a failure of the at least one radio positioning support device of the plurality of radio positioning support devices). The monitoring and/or controlling apparatus may then control the at least one radio positioning support device of the plurality of radio positioning support devices to re-establish the expected radio coverage, for example by increasing the transmission power of the at least one radio positioning support device of the plurality of radio positioning support devices (e.g. by transmitting according control information to the at least one radio positioning support device of the plurality of radio positioning support devices).

Moreover, radio signal parameters (e.g. measured received signal strengths) and/or state information represented by or contained in the plurality of monitoring reports may be evaluated (e.g. compared with expected radio signal parameters and/or expected state information).

Alternatively or additionally, the monitoring reports may be used for determining at least partially based on the monitoring reports whether or not the plurality of monitoring and/or controlling apparatuses installed in the predetermined environment is sufficient for monitoring and/or controlling the plurality of radio positioning support devices. For example, if none of the plurality of monitoring reports contains or represents an indication for a least one radio positioning support device of the plurality of radio positioning support devices, it may be determined that the plurality of monitoring and/or controlling apparatuses installed in the predetermined environment is not sufficient for monitoring and/or controlling the plurality of radio positioning support devices.

If it is determined that the plurality of monitoring and/or controlling apparatuses installed in the predetermined environment is not sufficient for monitoring and/or controlling the plurality of radio positioning support devices, one or more of the following steps may be performed:

determining and/or providing adjusting installation information for adjusting the installation position of one or more monitoring and/or controlling apparatuses of the plurality of monitoring and/or controlling apparatuses installed in the predetermined environment;

determining and/or providing information representing the one or more radio positioning support devices of the plurality of radio positioning support devices that are not monitored and/or controlled by the plurality of monitoring and/or controlling apparatuses installed in the predetermined environment;

determining one or more further potential installation positions for installing one or more further monitoring and/or controlling apparatuses in said predetermined environment for monitoring and/or controlling the one or more radio positioning support devices of the plurality of radio positioning support devices that are not monitored and/or controlled by the plurality of monitoring and/or controlling apparatuses installed in the predetermined environment.

Adjusting installation information for adjusting one or more installation positions of one or more monitoring and/or controlling apparatuses of the plurality of monitoring and/or controlling apparatuses installed in the predetermined environment may be understood to represent one or more adjusted installation positions of one or more monitoring and/or controlling apparatuses of the plurality of monitoring and/or controlling apparatuses. For example, if a respective monitoring and/or controlling apparatus of the plurality of monitoring and/or controlling apparatuses is expected to observe radios signals of one or more radio positioning support devices of the plurality of radio positioning support devices, but does not observe radio signals of at least one respective radio positioning support device of the one or more radio positioning support devices, the adjusted installation position may be determined to be closer to the installation position of the respective radio positioning support device of the plurality of radio positioning support devices than the installation position of the respective monitoring and/or controlling apparatus. Nevertheless, the adjusted installation position may be determined such that it is expected that the respective monitoring and/or controlling apparatus observes radio signals of other radio positioning support devices of the one or more radio positioning support devices at the adjusted installation position as well. The determining of the adjusted installation position may be performed at least partially based on the radio coverage map as disclosed above for the plurality of potential installation positions.

Providing the adjusting installation information for adjusting the installation position of one or more monitoring and/or controlling apparatuses of the plurality of monitoring and/or controlling apparatuses may be performed similar to providing the installation information for installing the plurality of monitoring and/or controlling apparatuses in the predetermined environment representing the plurality of potential installation positions as disclosed above.

Information representing the one or more radio positioning support devices of the the plurality of radio positioning support devices that are not monitored and/or controlled by the plurality of monitoring and/or controlling apparatuses installed in the predetermined environment may be understood indicate these radio positioning support devices. They may be provided the installation information for installing the plurality of monitoring and/or controlling apparatuses in the predetermined environment representing the plurality of potential installation positions as disclosed above.

The one or more further installation positions for installing one or more further monitoring and/or controlling apparatuses in said predetermined environment for monitoring and/or controlling the one or more radio positioning support devices of the plurality of radio positioning support devices that are not monitored and/or controlled by the plurality of monitoring and/or controlling apparatuses installed in the predetermined environment may be determined such that at least one of the one or more further installation positions is within each expected radio coverage of the one or more radio positioning support device of the plurality of radio positioning support devices. The determining of the one or more further installation positions may be performed at least partially based on the radio coverage map as disclosed above for the plurality of potential installation positions.

Providing the one or more further installation positions for installing one or more further monitoring and/or controlling apparatuses in said predetermined environment for monitoring and/or controlling the one or more radio positioning support devices of the plurality of radio positioning support devices may be performed similar to providing the installation information for installing the plurality of monitoring and/or controlling apparatuses in the predetermined environment representing the plurality of potential installation positions as disclosed above.

According to an exemplary embodiment of the invention, one or more radio positioning support devices of the plurality of radio positioning support devices are one of:
  a Bluetooth beacon;
  a Bluetooth beacon enabling Bluetooth low energy mode;
  a Bluetooth low energy beacon;
  an access point of a wireless local area network; and
  a cellular network node.

The beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. the area of the environment represented by the positioning map and/or of the above disclosed system) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may use the radio coverage map for the predetermined environment without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of 2 to 3 meters as well as a high reliability in floor detection may be achieved. The beacons may be stand-alone devices or be integrated into or attached to some other device. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

It is to be understood, however, that other types of radio nodes than variations of Bluetooth beacons may be used as well, for instance tags or other devices that are configured to transmit ultra-wideband (UWB) signals or any wireless radio signals that might emerge in the future.

For example, one or more radio positioning support devices of the plurality of radio positioning support devices may be an access point and/or a router of a WLAN. Such an access point and/or router of a WLAN may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

Alternatively or additionally, one or more radio positioning support devices of the plurality of radio positioning support devices may be cellular network nodes. Such cellular network nodes may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal. The 2G/3G/4G/5G cellular radio communication standards are developed by the 3GPP and presently available under http://www.3gpp.org/.

According to an exemplary embodiment of the invention, the method comprising:

generating the radio coverage map (e.g. at least partially based on radio fingerprint observation reports and/or monitoring reports).

According to an exemplary embodiment of the invention, the method is performed by a positioning server or by a positioning system comprising the plurality of radio positioning support devices and the positioning server. Optionally, the positioning system may comprise the plurality of monitoring and/or controlling apparatuses as disclosed above.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
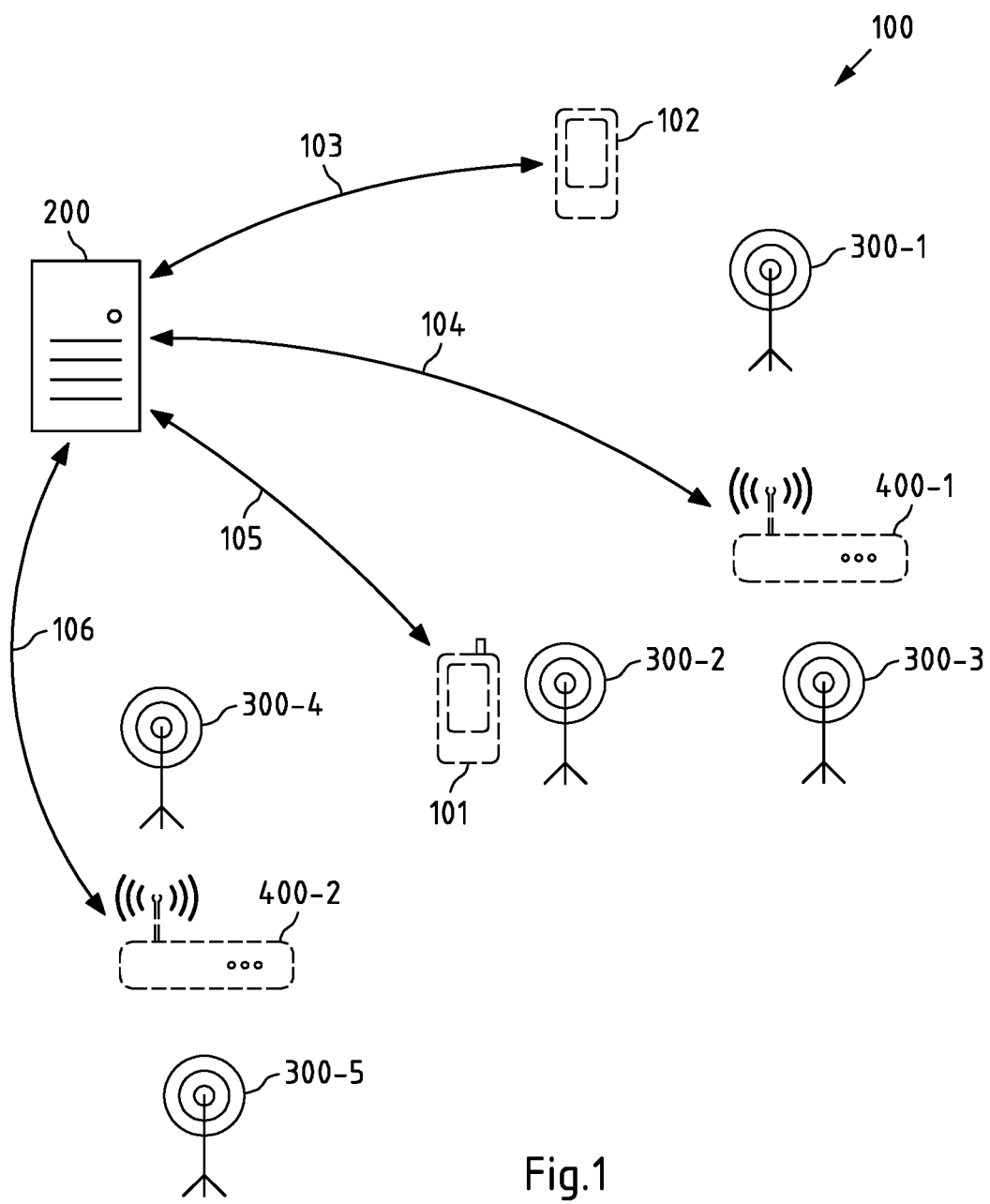
FIG. 1 is a block diagram of an exemplary embodiment of a system according to the invention.

FIG. 1 is a schematic high-level block diagram of a system 100 according to an exemplary aspect of the invention. In the following, it is assumed that system 100 is an indoor radio positioning system for a predetermined indoor environment.

The predetermined indoor environment of system 100 is for example inside a building or a complex of buildings like a shopping center, a parking garage, an airport, a company site, etc.

System 100 comprises a positioning server 200 and a plurality of radio positioning support devices 300-1 to 300-5. Optionally, system 100 may comprise a plurality of monitoring and/or controlling apparatuses 400-1 to 400-2 and a plurality of mobile devices 101 to 102. It is to be understood that system 100 may comprise further radio positioning support devices, monitoring and/or controlling apparatuses and mobile devices. In the following, it is thus referred to radio positioning support devices 300-1 to 300-5, monitoring and/or controlling apparatuses 400-1 to 400-2 and mobile devices 101 to 102 without limiting the scope of the invention.

For example, each of mobile devices 102-1 to 102-3 may be one of a smartphone, a tablet computer, a notebook computer, a smart watch and a smart band.

Indoor radio positioning system 100 is not limited to a single positioning server 200, but may optionally comprise a plurality of servers (e.g. forming a server cloud). Accordingly, the positioning server 200 may be part of such a plurality of servers (e.g. a server cloud) or may be represented by such a plurality of servers (e.g. a server cloud).

For example, radio positioning support devices 300-1 to 300-5 may be BLE beacons fixedly installed in the predetermined indoor environment of system 100. They may be configured to automatically and repeatedly transmit BLE radio signals like an advertisement signal. The BLE radio signal may be a radio positioning support signal containing and/or representing positioning support information and/or a radio state signal containing and/or representing state information. The positioning support information is for example configured to enable mobile devices 101 and 102 to estimate their position at least partially based on these positioning support information. An example of such positioning support information is an UUID of the respective one of BLE beacons 300-1 to 300-5 transmitting the respective radio positioning support signal containing this positioning support information. The state information may be understood to be characteristic for the current state of the respective one of BLE beacons 300-1 to 300-5 transmitting the respective radio state signal containing this state information. For example, such state information may indicate a radio transmission power and/or a battery condition. It is to be understood that system 100 is not limited to BLE beacons as radio positioning support devices 300-1 to 300-5. In the following, it is thus referred to radio positioning support devices 300-1 to 300-5 as BLE beacons 300-1 to 300-5 for exemplary purposes only without limiting the scope of the invention.

The monitoring and/or controlling apparatuses 400-1 and 400-2 may serve for monitoring and/or controlling BLE beacons 300-1 to 300-5. To this end, monitoring and/or controlling apparatuses 400-1 and 400-2 may be installed such that each BLE beacon of the BLE beacons 300-1 to 300-5 may be monitored and/or controlled by at least one monitoring and/or controlling apparatus of the monitoring and/or controlling apparatuses 400-1 and 400-2. Potential installation positions for installing the monitoring and/or controlling apparatuses 400-1 and 400-2 may be determined according to the method according to the invention (e.g. the method disclosed below with reference to FIG. 5).

In system 100, positioning server 200 and mobile devices 101 and 102 as well as positioning server 200 and monitoring and/or controlling apparatuses 400-1 and 400-2 may be configured to communicate with each other as indicated by communication paths 103 to 106, respectively. It is to be understood that communication paths 103 to 106 may comprise one or more communication links (e.g. one or more wireless communication links or one or more wireline communication links or a combination thereof). For example, communication paths 103 to 106 may include one or more communication links over one or more communication networks. For example, communication paths 103 and 105 are communication links over a cellular communication network like a 2G/3G/4G/5G cellular communication network; and communication paths 104 and 106 may be communication links over a local area network (LAN). As disclosed above, the 2G/3G/4G/5G cellular radio communication standards are developed by the 3GPP and presently available under http://www.3gpp.org/. An example of a LAN is an Ethernet as specified by the standards of the IEEE IEEE 802.3 family (http://www.ieee.org/).

Monitoring one or more BLE beacons of BLE beacons 300-1 to 300-5 by at least one of monitoring and/or controlling apparatuses 400-1 and 400-2 may for example be understood to mean that the at least one of monitoring and/or controlling apparatuses 400-1 and 400-2 scans for and/or evaluates (e.g. measures) radio signals (e.g. radio positioning support signals and/or radio state signals transmitted or triggered to be transmitted by the one or more BLE beacons). Monitoring one or more BLE beacons may thus at least involve a wireless one-way communication from the one or more BLE beacons to the at least one of monitoring and/or controlling apparatuses 400-1 and 400-2. For example, the monitoring and/or controlling apparatuses 400-1 and 400-2 may be configured to (e.g. automatically and/or repeatedly) scan for radio signals (e.g. radio positioning support signals or radio state signals) transmitted by the BLE beacons 300-1 to 300-5 and to generate a respective monitoring report at least partially based on the respective scanning results. Accordingly, each monitoring report may at least partially represent and/or may be at least partially generated based on radio signal scanning results of one of monitoring and/or controlling apparatuses 400-1 and 400-2. As disclosed above, radio signal scanning results may be understood to represent information which are characteristic for the observable radio signal(s) when scanning for radio signals. In the following, it is assumed that each monitoring report at least contains and/or represents an indication of one or more BLE beacons of BLE beacons 300-1 to 300-5 from which radio signals are observable by the respective one of monitoring and/or controlling apparatuses 400-1 and 400-2. For example, such a radio monitoring report contains and/or represents UUIDs of the one or more BLE beacons from which radio signals are observable by the respective one of monitoring and/or controlling apparatuses 400-1 and 400-2. The monitoring and/or controlling apparatuses 400-1 and 400-2 may be configured to collect the monitoring reports and to (e.g. automatically and/or repeatedly) transmit the collected monitoring reports to the positioning server 200 (e.g. via communication paths 104 and 106).

Controlling one or more BLE beacons of BLE beacons 300-1 to 300-5 by at least one of monitoring and/or controlling apparatuses 400-1 and 400-2 may be understood to mean that the at least one of monitoring and/or controlling apparatuses 400-1 and 400-2 controls one or more radio signal parameters (e.g. the transmission power) of the one or more BLE beacons, for example by transmitting or triggering transmitting control information (e.g. in the form of a radio control signal) to the one or more BLE beacons. Controlling one or more BLE beacons may thus at least involve a wireless one-way communication from the at least one of monitoring and/or controlling apparatuses 400-1 and 400-2 to the one or more BLE beacons. For example, the monitoring and/or controlling apparatuses 400-1 and 400-2 may be configured to control one or more BLE beacons of BLE beacons 300-1 to 300-5, for example by transmitting or triggering transmitting control information (e.g. in the form of a radio control signal) for controlling one or more radio signal parameters (e.g. the transmission power) of the one or more BLE beacons to the one or more BLE beacons.

Moreover, mobile devices 101 to 102 may be configured for collecting radio fingerprint observation reports for updating and/or generating the radio coverage map for the predetermined indoor environment of system 100 and for reporting (e.g. transmitting) the collected radio fingerprint observation reports to the positioning server 200 (e.g. via the communication paths 103 and 105, respectively). To this end, the mobile devices 101 and 102 may be configured to (e.g. automatically and/or repeatedly) scan for radio signals (e.g. radio positioning support signals transmitted by BLE beacons 300-1 to 300-5) and to generate a respective radio fingerprint observation report at least partially based on the respective scanning results. In the following, it is assumed that each radio fingerprint observation report at least contains and/or represents an indication of a respective observation position at which the respective mobile device scanned for radio signals and one or more BLE beacons from which radio signals are observable by the respective mobile device at the respective observation position. For example, such a radio fingerprint observation report contains and/or represents GNSS coordinates of the respective observation position and UUIDs of the one or more BLE beacons from which radio signals are observable by the respective mobile device at the respective observation position.

The indoor radio positioning server 101 may use these radio fingerprint observation reports for generating and/or updating a radio coverage map. The radio coverage map may be configured to enable each of the mobile devices 101 and 102 to estimate its position at least partially based on this radio coverage map when the respective mobile device is located in the predetermined indoor environment of system 100. The positioning server 200 may be configured for transmitting radio coverage map information representing the radio coverage map to the mobile devices 101 and 102 (e.g. via the communication paths 103 and 105, respectively). The mobile devices 101 and 102 may then use this radio coverage map information for estimating their position based on radio signals received from the BLE beacons 300-1 to 300-5 when they are located in the predetermined indoor environment of system 100.

Figure 2:
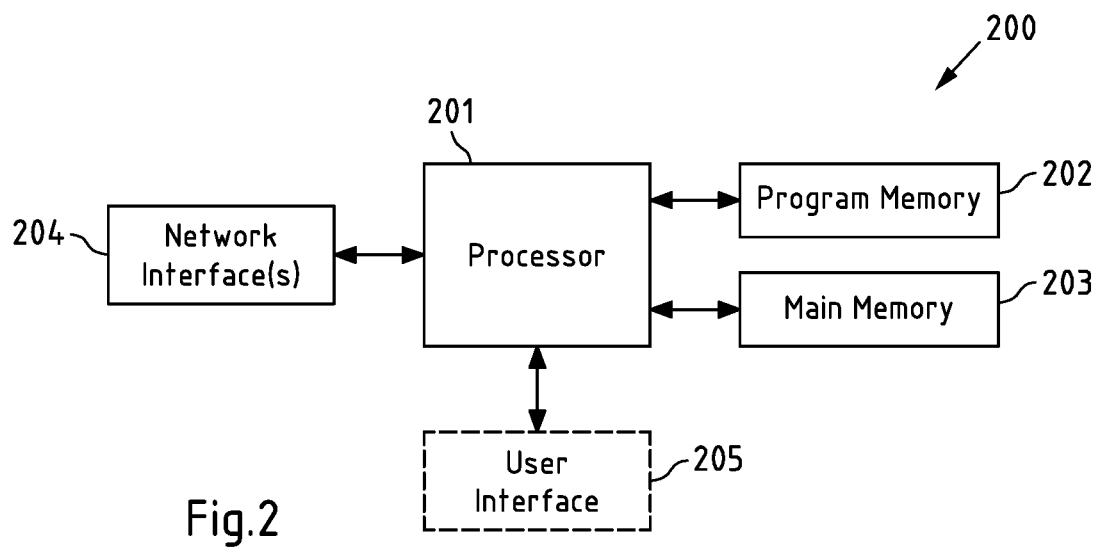
FIG. 2 is a block diagram of an exemplary embodiment of an apparatus according to the invention.

FIG. 2 is a block diagram of an exemplary embodiment of an apparatus according to the invention. In the following, it is assumed that this apparatus corresponds to positioning server 200 of system 100 of FIG. 1.

Positioning server 200 comprises a processor 201. Processor 201 may represent a single processor or two or more processors, which are for instance at least partially coupled, for instance via a bus. Processor 201 executes a program code stored in program memory 202 (for instance program code causing mobile device 200 to perform one or more of the embodiments of a method according to the invention or parts thereof (e.g. the method or parts of the method disclosed below with reference to FIG. 5), when executed on processor 201), and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203) could be fixedly connected to the processor (e.g. processor 201 and/or processor 301) or at least partially removable from the processor, for instance in the form of a memory card or stick.

A program memory (e.g. program memory 202) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 203) may for instance be a volatile memory. It may for instance be a DRAM memory, to give non-limiting example. It may for instance be used as a working memory for a processor (e.g. processor 201) when executing an operating system and/or programs.

Processor 201 further controls one or more network interface(s) 204 which are for example configured to communicate via a network like a cellular communication network and/or a LAN. Positioning server 200 may use network interface(s) 204 to communicate with mobile devices 101 and 102 (e.g. via one of communication paths 103 and 105) and/or monitoring and/or controlling apparatuses 400-1 and 400-2 of system 100 (e.g. via one of communication paths 104 and 106).

Furthermore, processor 201 controls a user interface 205 configured to present information to a user of positioning server 200 and/or to receive information from such a user. User interface 205 may for instance be the standard user interface via which a user of positioning server 200 controls other functionality thereof. Examples of such a user interface are a touch-sensitive display, a keyboard, a touchpad, a display, etc.

The components 202 to 205 of positioning server 200 may for instance be connected with processor 201 by means of one or more serial and/or parallel busses.

It is to be understood that positioning server 200 may comprise various other components.

Figure 3:
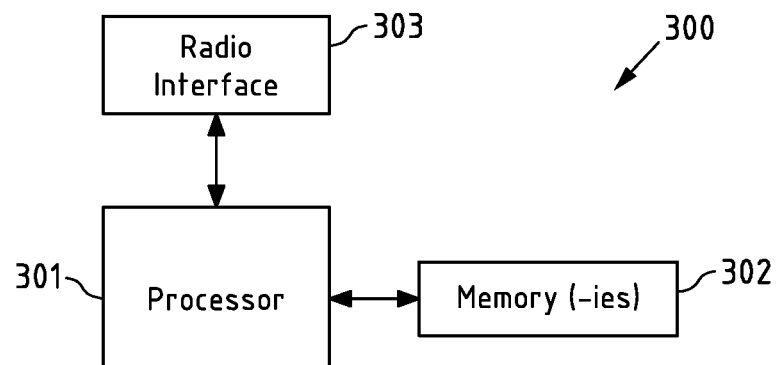
FIG. 3 is a block diagram of an exemplary embodiment of a radio positioning support device.

FIG. 3 is a block diagram of an exemplary embodiment of a radio positioning support device according to the invention. In the following, it is assumed that this radio positioning support device corresponds to a BLE beacon 300 like BLE beacons 300-1 to 300-5 of system 100.

BLE beacon 300 comprises a processor 301. Processor 301 may represent a single processor or two or more processors, which are for instance at least partially coupled, for instance via a bus. Processor 301 executes a program code stored in memory 302. Some or all of memory 302 may also be included into processor 301. Memory 302 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 301 when executing an operating system and/or programs. Memory 302 may also comprise an operating system for processor 301. Memory 302 may for instance comprise a first memory portion that is fixedly installed in BLE beacon 300, and a second memory portion that is removable from beacon 300, for instance in the form of a removable SD memory card.

Processor 301 further controls a radio interface 303 configured to receive and/or transmit radio signals. For instance, radio interface 303 may at least comprise a BLE component including a BLE transmitter (TX). The radio interface 303 may additionally comprise a BLE receiver (RX). The transmitter and receiver may also be part of a BLE transceiver (TRX).

The BLE transmitter enables BLE beacon 300 to send radio signals in line with any current or future version of the Bluetooth standard supporting a low energy mode. For example, the BLE transmitter may be configured to automatically and repeatedly transmit BLE radio signals like an advertisement signal. As disclosed above in more detail, such a BLE radio signal may be a radio positioning support signal containing and/or representing positioning support information and/or a radio state signal containing and/or representing state information. Likewise, the BLE receiver enables BLE beacon 300 to receive radio signals in line with any current or future version of the Bluetooth standard supporting a low energy mode. For example, the BLE receiver may be configured to receive radio control signals from a monitoring and/or controlling apparatus like one or monitoring and/or controlling apparatuses 400-1 and 400-2 of system 100. Such a radio control signal may contain and/or represent control information for controlling one or more one or more radio signal parameters (e.g. the transmission power) of the radio interface 303.

It is to be understood that BLE beacon 300 may comprise various other components.

Figure 4:
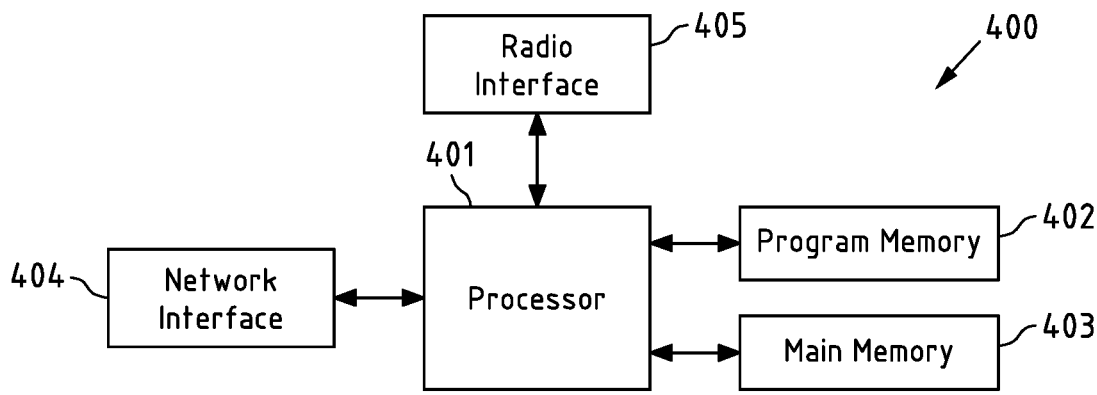
FIG. 4 is a block diagram of an exemplary embodiment of a monitoring and/or controlling apparatus.

FIG. 4 is a block diagram of an exemplary embodiment of a monitoring and/or controlling apparatus 400 according to the invention. In the following, it is assumed that this monitoring and/or controlling apparatus 400 corresponds to monitoring and/or controlling apparatuses 400-1 and 400-2 of system 100 of FIG. 1.

Monitoring and/or controlling apparatus 400 comprises a processor 401. Processor 401 may represent a single processor or two or more processors, which are for instance at least partially coupled, for instance via a bus. Processor 401 executes a program code stored in program memory 402 and interfaces with a main memory 403. Program memory 402 may also comprise an operating system for processor 401. Some or all of memories 402 and 403 may also be included into processor 301.

Processor 401 controls a network interface 404 which is for example configured to communicate via a communication network like a LAN. Monitoring and/or controlling apparatus 400 may use network interface 404 to communicate with positioning server 200 of system 100 (e.g. via one of communication paths 104 and 106).

Moreover, processor 401 controls radio interface 405 configured to receive and/or transmit radio signals. For instance, radio interface 405 may at least comprise a BLE component including a BLE transmitter (TX). The radio interface 303 may additionally comprise a BLE receiver (RX). The transmitter and receiver may also be part of a BLE transceiver (TRX).

The BLE transmitter enables monitoring and/or controlling apparatus 400 to send radio signals in line with any current or future version of the Bluetooth standard supporting a low energy mode. For example, the BLE transmitter may be configured to transmit BLE radio signals like an advertisement signal. As disclosed above in more detail, such a BLE radio signal may be a radio control signal containing and/or representing control information for controlling one or more one or more radio signal parameters (e.g. the transmission power) of one or more BLE beacons like BLE beacons 300-1 to 300-5 of system 100. Likewise, the BLE receiver enables monitoring and/or controlling apparatus 400 to receive radio signals in line with any current or future version of the Bluetooth standard supporting a low energy mode. For example, the BLE receiver may be configured to receive radio signals like radio positioning support signals and/or radio state signals from one or more BLE beacons like BLE beacons 300-1 to 300-5 of system 100. In particular, the BLE receiver may be configured to scan for radio signals that are transmitted by BLE beacons like BLE beacons 300-1 to 300-5 of system 100, to evaluate received radio signals (e.g. by measuring a received signal strength) and/or to extract information (e.g. a UUID and/or state information) contained in and/or represented by received BLE radio signals. It is to be understood that any computer program code based processing required for receiving and processing received BLE radio signals may be stored in an own memory of the radio interface 405 and executed by an own processor of the radio interface 405 or it may be stored for example in memory 403 and executed for example by processor 401.

The components 402 to 405 of monitoring and/or controlling apparatus 400 may for instance be connected with processor 401 by means of one or more serial and/or parallel busses.

It is to be understood that monitoring and/or controlling apparatus 400 may comprise various other components. For example, monitoring and/or controlling apparatus 400 may optionally comprise a user interface (e.g. a touch-sensitive display, a keyboard, a touchpad, a display, etc).

Figure 5:
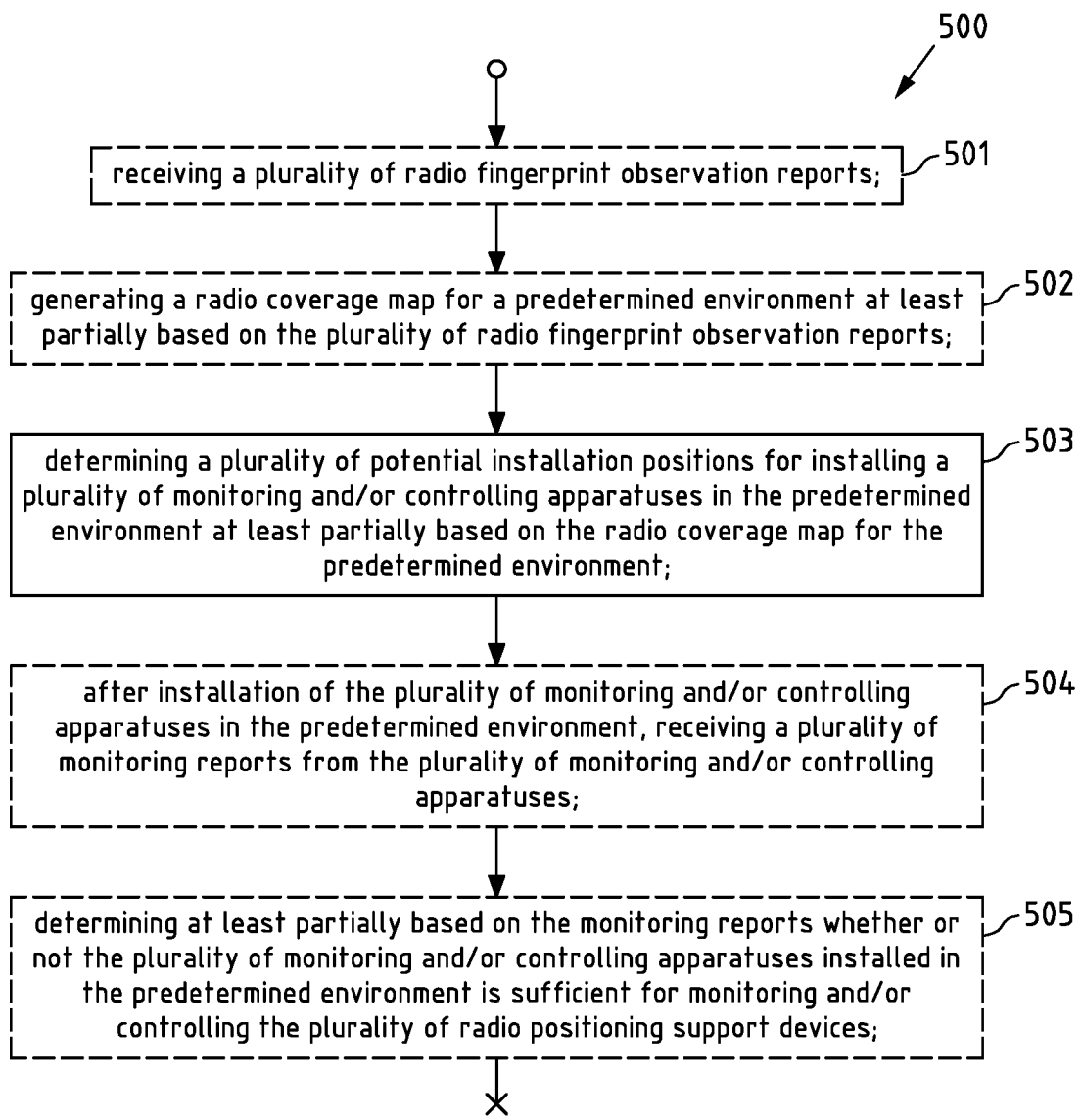
FIG. 5 is a flow chart illustrating an exemplary embodiment of a method according to the invention.

FIG. 5 is a flow chart 500 illustrating an exemplary embodiment of a method according to the invention. Without limiting the scope of the invention, it is assumed in the following that positioning server 200 of indoor radio positioning system 100 as described above with respect to FIG. 1 performs the steps of flow chart 500.

In an optional step 501, a plurality of radio fingerprint observation reports are received from one or more mobile devices at positioning server 200. For example, the plurality of radio fingerprint observation reports are received from mobile devices 101 and 102 via communication paths 103 and 105. As disclosed above in more detail, each radio fingerprint observation report of the plurality of radio fingerprint observation reports contains and/or represents an indication of a respective observation position (e.g. GNSS coordinates of the respective observation position) and one or more BLE beacons (e.g. UUIDs of the one or more BLE beacons) of BLE beacons 300-1 to 300-5 from which radio signals are observable at the respective observation position.

In an optional step 502, a radio coverage map for the predetermined indoor environment of system 100 is generated by positioning server 200 at least partially based on the plurality of radio fingerprint observation reports received in step 501.

The radio coverage map for the predetermined indoor environment of system 100 may represent at least the expected radio coverage of the BLE beacons 300-1 to 300-5 that are installed in the predetermined indoor environment. The radio coverage model of such a BLE beacon may describe the area (e.g. the area of the predetermined indoor environment) within which a radio signal transmitted by this BLE beacon is expected to be observable (e.g. receivable with a minimum quality, e.g. a minimum signal-to-noise ratio and/or a minimum signal power, e.g. at least −90 dbm or −95 dbm). The real radio coverage of such a BLE beacon may however deviate from the expected radio coverage as described by such a radio coverage model. As disclosed in more detail above, a radio coverage model of a BLE beacon may be a hard-boundary model or a soft-boundary model (e.g. a hard-boundary model or a soft-boundary model describing expected radio coverage).

Accordingly, generating the radio coverage map for the predetermined indoor environment of system 100 at least partially based on the plurality of radio fingerprint observation reports may involve determining, for the BLE beacons 300-1 to 300-5 of system 100, a respective radio coverage model at least partially based on the plurality of radio fingerprint observation reports. Additionally, this generating may be based on further information (e.g. a previously generated radio coverage map for the predetermined indoor environment). For example, a previously generated radio coverage map for the predetermined indoor environment of system 100 may be updated by determining, for one or more (e.g. all) of BLE beacons 300-1 to 300-5 a respective radio coverage model at least partially based on the plurality of radio fingerprint observation reports.

As disclosed above in more detail, a radio coverage model of a BLE beacon may be soft-boundary model like a parametric radio model or a hard-boundary radio coverage model like a geometric model. In the following it is assumed that the radio coverage map for the predetermined indoor environment represents geometric models for the expected radio coverage of BLE beacons 300-1 to 300-5. Examples of such a geometric model are a polygon; a rectangle and/or a square; a cuboid and/or a cube; an ellipse and/or a circle; and an ellipsoid and/or a sphere. Such a geometric model which is used as radio coverage model for a respective BLE beacon of BLE beacons 300-1 to 300-5 may for example describe (e.g. represent and/or enclose) an area within which a beacon signal transmitted by the respective BLE beacon 5 is expected to be observable (e.g. receivable with a minimum quality, e.g. a minimum signal-to-noise ratio and/or a minimum signal power, e.g. at least −90 dbm or −95 dbm).

A parameter of a geometric model of a radio coverage of a radio positioning support device may be at least partially determined (e.g. selected or calculated) at least partially based on the plurality of radio fingerprint observation reports. Examples of such parameters are a diameter, a radius and/or an edge length of the geometric model. For example, a parameter of a geometric model for the expected radio coverage of a BLE beacon may be selected from a list of parameters according to a predetermined mapping with the radio signal parameters associated with this BLE beacon as represented by the plurality of radio fingerprint observation reports.

Figure 6:
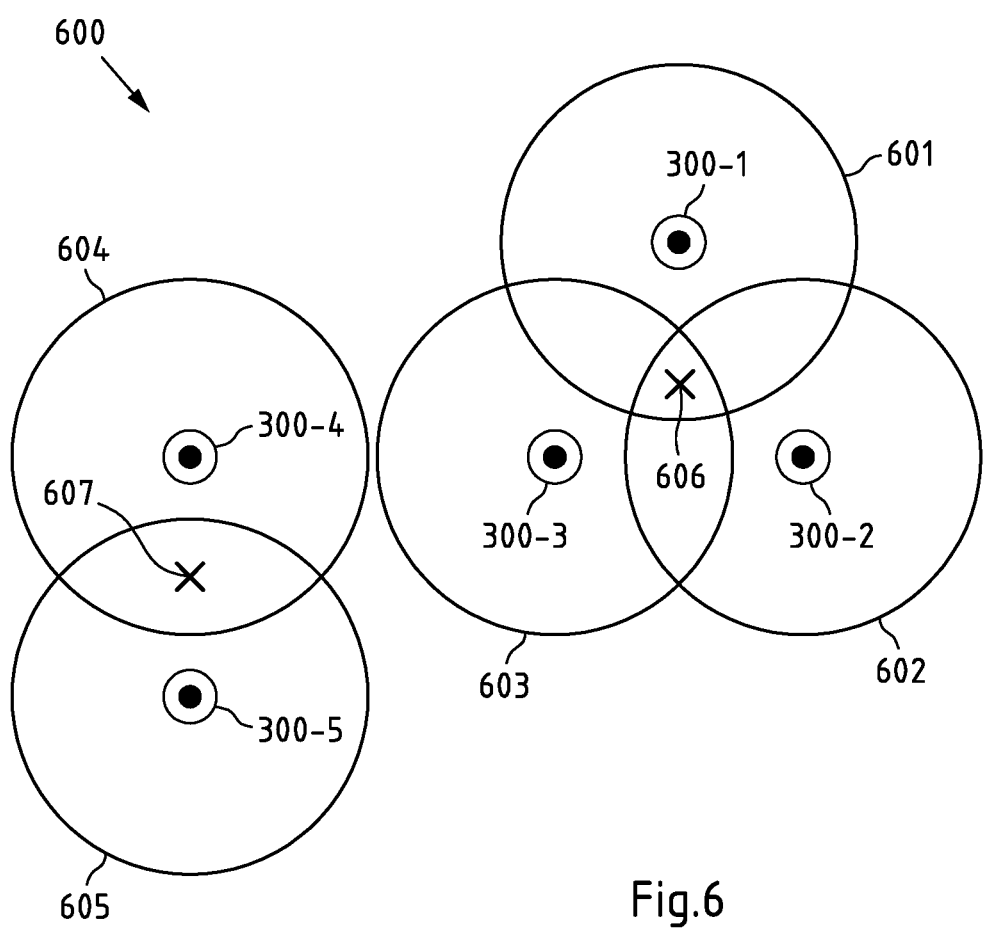
FIG. 6 is a schematic illustration of an exemplary embodiment of a radio coverage map.

FIG. 6 is a schematic illustration of an exemplary embodiment of radio coverage map 600 containing circles 601 to 605 as geometric models for the expected radio coverage of BLE beacons 300-1 to 300-5, respectively. Moreover, radio coverage map 600 represents the installation positions (denoted by reference signs 300-1 to 300-5) of the BLE beacons 300-1 to 300-5. Accordingly, such a circle (e.g. circle 601) represents the area within which a radio signal transmitted by the BLE beacon (e.g. BLE beacon 300-1) the installation position of which is in the center of the circle is receivable with a minimum quality (e.g. a minimum signal-to-noise ratio and/or a minimum signal power, e.g. at least −90 dbm or −95 dbm).

In step 503, a plurality of potential installation positions for installing a plurality of monitoring and/or controlling apparatuses like monitoring and/or controlling apparatuses 400-1 and 400-2 in the predetermined indoor environment of system 100 are determined by positioning server 200 at least partially based on the radio coverage map for the predetermined indoor environment.

A potential installation position may be understood to describe a position in the predetermined indoor environment and/or relative to the predetermined indoor environment. For example, a potential installation position may be understood to describe a position in the predetermined indoor environment at which one of monitoring and/or controlling apparatuses 400-1 and 400-2 may be installed. As disclosed above, the potential installation positions may be selected from a plurality of predetermined positions in the predetermined indoor environment. This may be understood to mean that only the plurality of predetermined positions are considered as potential installation positions when determining the plurality of potential installation positions in step 503. For example, the plurality of predetermined positions may represent positions in the predetermined indoor environment that are (e.g. easy) accessible for installing monitoring and/or controlling apparatuses; and/or the plurality of predetermined positions may represent mesh points of a predetermined mesh (e.g. a mesh with a mesh size of 5 m or 2 m or 1 m) when the predetermined mesh overlays the predetermined environment.

The determining in step 503 may be performed according to predetermined rules like a predetermined algorithm or predetermined instructions (e.g. in the form of computer program code) receiving and/or considering the radio coverage map or the radio coverage map information as an input parameter.

For example, the plurality of potential installation positions for installing the plurality of monitoring and/or controlling apparatuses in the predetermined environment are determined iteratively in step 503. In each iteration, a respective potential installation position for a respective monitoring and/or controlling apparatus for monitoring and/or controlling a maximum number of respective radio positioning support devices of the plurality of radio positioning support devices that are not expected to be monitored and/or controlled by any other monitoring and/or controlling apparatus installed at any installation position determined in any previous iteration is determined.

Radio coverage map 600 of FIG. 6 indicates two potential installation positions 606 and 607. Potential installation positions 606 and 607 may represent mesh points of a predetermined mesh. In a first iteration, potential installation position 606 may be determined for installing one of monitoring and/or controlling apparatuses 400-1 and 400-2. Potential installation position 606 is located in an overlapping area of circles 601 to 603 which describe the expected radio coverages of BLE beacons 300-1 to 300-3. Since radio coverage map 600 does not represent any other overlapping area of three circles, it is expected that installing one of monitoring and/or controlling apparatuses 400-1 and 400-2 at potential installation position 606 enables monitoring and/or controlling a maximum number of BLE beacons, i.e. BLE beacons 300-1 to 300-3. In a second iteration, potential installation position 607 may be determined. Potential installation position 607 is located in an overlapping area of circles 604 and 605 which describe the expected radio coverages of BLE beacons 300-4 to 300-5 which are not expected to be monitored and/or controlled by the one of monitoring and/or controlling apparatus 400-1 and 400-2 installed at potential installation position 606. Installing the remaining one of monitoring and/or controlling apparatuses 400-1 and 400-2 at potential installation position 607 is expected to enable monitoring and/or controlling BLE beacons 300-4 and 300-5. After the second iteration, the iteratively determining may be terminated, because each BLE beacon of BLE beacons 300-1 to 300-5 of system 100 is expected to be monitored and/or controlled by at least one of monitoring and/or controlling apparatuses 400-1 and 400-2 when they are installed at potential installations positions 606 and 607, respectively.

By iteratively determining the plurality of potential installation positions for installing the plurality of monitoring and/or controlling apparatuses in the predetermined environment, the number of potential installation positions of the plurality of potential installation positions is minimized which means that a minimum number of monitoring and/or controlling apparatuses is expected to be sufficient for monitoring and/or controlling the plurality of radio positioning support devices.

Subsequently, installation information comprising respective position information for each potential installation position of the potential installation positions determined in step 503 (e.g. potential installation positions 606 and 607) may be provided, for example by displaying the installation information in form of radio coverage map 600 with potential installation positions 606 and 607 (alone or with additional information like a floor map of the predetermined indoor environment) on user interface 205 of positioning server 200. Alternatively, positioning server 200 may transmit the installation information to another device like one of mobile devices 101 and 102 for displaying the installation information in form of radio coverage map 600 with potential installation positions 606 and 607 (alone or with additional information like a floor map of the predetermined indoor environment) on a user interface of this device.

After installation of the monitoring and/or controlling apparatuses 400-1 and 400-2 in the predetermined indoor environment (i.e. at the potential installations positions 606 and 607, respectively), a plurality of monitoring reports is received by the positioning server 200 from the monitoring and/or controlling apparatuses 400-1 and 400-2 in an optional step 504. For example, the plurality of monitoring reports are received from monitoring and/or controlling apparatuses 400-1 and 400-2 via communication paths 104 and 106. As disclosed above, each monitoring report of the plurality of monitoring reports contains and/or represents an indication of one or more BLE beacons (e.g. UUIDs of the one or more BLE beacons) of BLE beacons 300-1 to 300-5 from which radio signals are observable by the respective one of monitoring and/or controlling apparatuses 400-1 and 400-2.

As disclosed above in more detail, the positioning server 200 may use the plurality of monitoring reports for generating the radio coverage map like (e.g. instead of or in addition to) the plurality of radio fingerprint observation reports and/or for monitoring the BLE beacons 300-1 to 300-5. For example, a monitoring report received from monitoring and/or controlling apparatus 400-1 installed at potential installation position 607 is expected to contain and/or represent an indication of BLE beacons 300-4 and 300-5. If such a monitoring report does however not contain and/or represent an indication of BLE beacon 300-4, this may indicate that the radio coverage of the BLE beacon 300-4 has changed (e.g. due to a change in the radio environment and/or a failure of the BLE beacon 300-4).

In an optional step 505, it is determined by the positioning server 200 at least partially based on the plurality of monitoring reports received in step 504 whether or not the monitoring and/or controlling apparatuses 400-1 and 400-2 installed in the predetermined indoor environment of system 100 are sufficient for monitoring and/or controlling the BLE beacons 300-1 to 300-5.

For example, if none of the plurality of monitoring reports received in step 504 contains or represents an indication for a least one BLE beacon of BLE beacons 300-1 to 300-5, it may be determined that monitoring and/or controlling apparatuses 400-1 and 400-2 installed at potential installation positions 606 and 607, respectively, in the predetermined indoor environment are not sufficient for monitoring and/or controlling BLE beacons 300-1 to 300-5.

If it is determined in step 505 that monitoring and/or controlling apparatuses 400-1 and 400-2 installed at potential installation positions 606 and 607, respectively, in the predetermined indoor environment are not sufficient for monitoring and/or controlling BLE beacons 300-1 to 300-5, one or more of the following steps may be performed:

determining and/or providing adjusting installation information for adjusting the installation position of one or more of monitoring and/or controlling apparatuses 400-1 and 400-2;

determining and/or providing information representing the one or more BLE beacons of the BLE beacons 300-1 to 300-5 that are not monitored and/or controlled by monitoring and/or controlling apparatuses 400-1 and 400-2;

determining one or more further potential installation positions for installing one or more further monitoring and/or controlling apparatuses in said predetermined indoor environment for monitoring and/or controlling the one or more BLE beacons of the BLE beacons 300-1 to 300-5 that are not monitored and/or controlled by monitoring and/or controlling apparatuses 400-1 to 400-2.

It is to be understood that the orders of the steps of flowchart 500 is only exemplary and that the steps may also have a different order if possible. Furthermore, it is also possible that two or more steps may be performed in one step.

Figure 7:
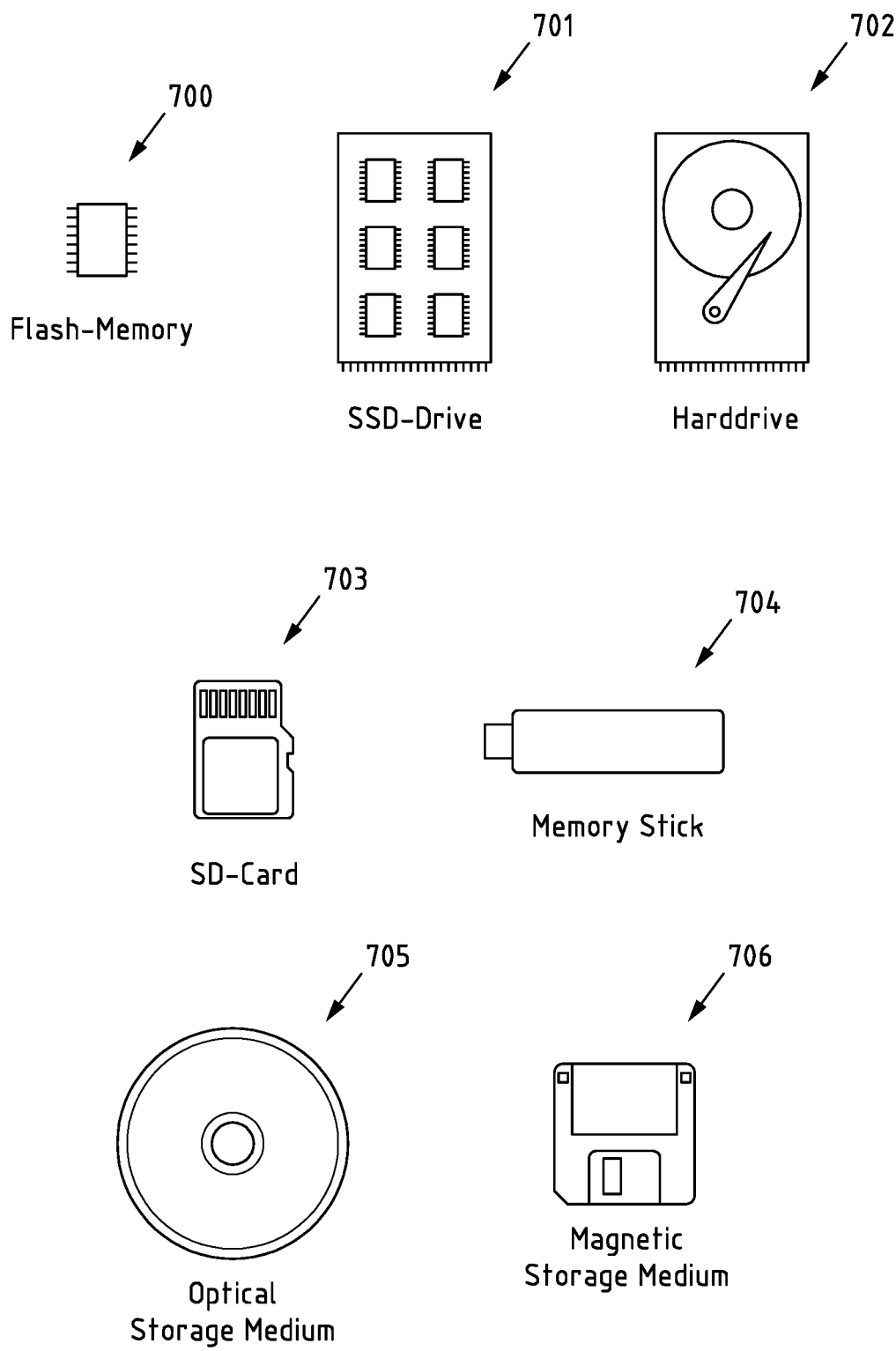
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement memory 202 of FIG. 2, memory 302 of FIG. 3 and memory 402 of FIG. 4. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus, said apparatus comprising at least one processor and at least one memory containing computer program code, said at least one memory and said computer program code configured to, with said at least one processor, cause said apparatus at least to perform:
   receiving a plurality of radio fingerprint observation reports;
   generating a radio coverage map for a predetermined environment at least partially based on said plurality of radio fingerprint observation reports; and
   from among a plurality of potential installation positions in the predetermined environment, determining one or more potential installation positions for installing one or more monitoring and controlling apparatuses in one or more different positions within the predetermined environment at least partially based on the radio coverage map that represents respective radio coverage models for a plurality of radio positioning support devices installed in said predetermined environment, wherein each monitoring and controlling apparatus of said one or more monitoring and controlling apparatuses is configured for monitoring and controlling one or more radio positioning support devices of the plurality of radio positioning support devices, wherein the one or more radio positioning support devices are fixedly installed within the predetermined environment and are configured to transmit radio signals containing or representing positioning support information that enables estimation of one or more mobile device positions based on the positioning support information, and wherein a respective monitoring and controlling apparatus is configured to monitor one or more radio positioning support devices by scanning for radio signals transmitted by one or more radio positioning support devices and to control one or more radio signal parameters including transmission power of one or more radio positioning support devices.

2. The apparatus according to claim 1, wherein said one or more potential installation positions for installing said one or more monitoring and controlling apparatuses in said predetermined environment are determined iteratively.

3. The apparatus according to claim 1, wherein said at least one memory and said computer program code further configured to, with said at least one processor, cause said apparatus to perform:
   providing installation information for installing said one or more monitoring and controlling apparatuses in said predetermined environment representing said one or more potential installation positions.

4. The apparatus according to claim 3, wherein said at least one memory and said computer program code are configured to, with said at least one processor, cause the apparatus to provide the installation information by causing installation information identifying the one or more potential installation positions to be displayed on a user interface.

5. The apparatus according to claim 1, wherein said at least one memory and said computer program code further configured to, with said at least one processor, cause said apparatus to perform:
   after installation of said one or more monitoring and controlling apparatuses in said predetermined environment, receiving a plurality of monitoring reports from said one or more monitoring and controlling apparatuses.

6. The apparatus according to claim 5, wherein said at least one memory and said computer program code further configured to, with said at least one processor, cause said apparatus to perform:
   determining at least partially based on said monitoring reports whether or not said one or more monitoring and controlling apparatuses installed in said predetermined environment is sufficient for monitoring and controlling said plurality of radio positioning support devices.

7. The apparatus according to claim 5, wherein each of said monitoring reports of said plurality of observation reports at least partially contains or represents an indication of one or more radio positioning support devices of said plurality of radio positioning support devices from which radio signals are observable at said respective observation position.

8. The apparatus according to claim 7, wherein each monitoring report of said plurality of monitoring reports indicates one or more radio signal parameter of one or more radio positioning support devices of said plurality of radio positioning support devices from which radio signals are observable by said respective monitoring and controlling apparatus of said one or more monitoring and controlling apparatuses.

9. The apparatus according to claim 5, wherein one or more of the plurality of monitoring reports comprise a received signal strength of radio signals that have been observed, and wherein said at least one memory and said computer program code are further configured to, with said at least one processor, cause said apparatus to perform:
   evaluating the received signal strength of the one or more monitoring reports relative to expected radio signal parameters; and
   based on the one or more monitoring reports, determining installation information for adjusting the installation position of a respective monitoring and controlling apparatus.

10. A method performed by an apparatus, said method comprising:
   receiving a plurality of radio fingerprint observation reports;
   generating a radio coverage map for a predetermined environment at least partially based on said plurality of radio fingerprint observation reports; and
   from among a plurality of potential installation positions in the predetermined environment, determining one or more potential installation positions for installing one or more monitoring and controlling apparatuses in one or more different positions within the predetermined environment at least partially based on the radio coverage map that represents respective radio coverage models for a plurality of radio positioning support devices installed in said predetermined environment, wherein each monitoring and controlling apparatus of said one or more monitoring and controlling apparatuses is configured for monitoring and controlling one or more radio positioning support devices of the plurality of radio positioning support devices, wherein the one or more radio positioning support devices are fixedly installed within the predetermined environment and are configured to transmit radio signals containing or representing positioning support information that enables estimation of one or more mobile device positions based on the positioning support information, and wherein a respective monitoring and controlling apparatus is configured to monitor one or more radio positioning support devices by scanning for radio signals transmitted by one or more radio positioning support devices and to control one or more radio signal parameters including transmission power of one or more radio positioning support devices.

11. The method according to any of claim 10, wherein said one or more potential installation positions for installing said one or more monitoring and controlling apparatuses in said predetermined environment are determined iteratively.

12. The method according to any of claim 10, said method further comprising:
providing installation information for installing said one or more monitoring and controlling apparatuses in said predetermined environment representing said one or more potential installation positions.

13. The method according to claim 12, wherein providing the installation information comprising causing the installation information identifying the one or more potential installation positions to be displayed on a user interface.

14. The method according to claim 10, said method further comprising:
after installation of said one or more monitoring and controlling apparatuses in said predetermined environment, receiving a plurality of monitoring reports from said one or more monitoring and controlling apparatuses.

15. The method according to claim 14, said method further comprising:
determining at least partially based on said monitoring reports whether or not said one or more monitoring and controlling apparatuses installed in said predetermined environment is sufficient for monitoring and controlling said plurality of radio positioning support devices.

16. The method according to claim 14, wherein each of said monitoring reports of said plurality of observation reports at least partially contains or represents an indication of one or more radio positioning support devices of said plurality of radio positioning support devices from which radio signals are observable at said respective observation position.

17. The method according to claim 14, wherein one or more of the plurality of monitoring reports comprise a received signal strength of radio signals that have been observed, and wherein the method further comprises:
evaluating the received signal strength of the one or more monitoring reports relative to expected radio signal parameters; and
based on the one or more monitoring reports, determining installation information for adjusting the installation position of a respective monitoring and controlling apparatus.

18. A positioning system, said positioning system comprising:
a plurality of radio positioning support devices installed in a predetermined environment; and
a positioning server, said positioning server comprising at least one processor and at least one memory containing computer program code, said at least one memory and said computer program code configured to, with said at least one processor, cause said positioning server at least to perform:
receiving a plurality of radio fingerprint observation reports;
generating a radio coverage map for the predetermined environment at least partially based on said plurality of radio fingerprint observation reports; and
from among a plurality of potential installation positions in the predetermined environment, determining one or more potential installation positions for installing one or more monitoring and controlling apparatuses in one or more different positions within the predetermined environment at least partially based on radio coverage map that represents respective radio coverage models for the plurality of radio positioning support devices installed in said predetermined environment, wherein each monitoring and controlling apparatus of said one or more monitoring and controlling apparatuses is configured for monitoring and controlling one or more radio positioning support devices of said plurality of radio positioning support devices, wherein the one or more radio positioning support devices are fixedly installed within the predetermined environment and are configured to transmit radio signals containing or representing positioning support information that enables estimation of one or more mobile device positions based on the positioning support information, and wherein a respective monitoring and controlling apparatus is configured to monitor one or more radio positioning support devices by scanning for radio signals transmitted by one or more radio positioning support devices and to control one or more radio signal parameters including transmission power of one or more radio positioning support devices.

19. An apparatus according to claim 1, wherein said at least one memory and said computer program code are configured to, with said at least one processor, cause said apparatus to determine the one or more potential installation positions by determining a respective potential installation position to be within a region of overlap between radio coverage models of a plurality of radio positioning support devices.

20. An apparatus according to claim 1, wherein said at least one memory and said computer program code are configured to, with said at least one processor, cause said apparatus to determine the one or more potential installation positions so as to enable monitoring and controlling of a maximum number of radio positioning support devices.

* * * * *